United States Patent
Mansouri et al.

(10) Patent No.: US 10,124,899 B2
(45) Date of Patent: Nov. 13, 2018

(54) HYBRID COMPOSITE STRUCTURAL MEMBER

(71) Applicant: Zodiac Seats US LLC, Gainesville, TX (US)

(72) Inventors: Reza Mansouri, Huntington Beach, CA (US); Guillaume R. Thomas, Huntington Beach, CA (US); Jeremy Green, Lantana, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 51 days.

(21) Appl. No.: 15/314,123

(22) PCT Filed: Jun. 2, 2015

(86) PCT No.: PCT/US2015/033690
§ 371 (c)(1),
(2) Date: Nov. 28, 2016

(87) PCT Pub. No.: WO2015/187633
PCT Pub. Date: Dec. 10, 2015

(65) Prior Publication Data
US 2017/0096226 A1    Apr. 6, 2017

Related U.S. Application Data

(60) Provisional application No. 62/006,964, filed on Jun. 3, 2014.

(51) Int. Cl.
*B64D 11/06*    (2006.01)

(52) U.S. Cl.
CPC .......... *B64D 11/0648* (2014.12); *B64D 11/06* (2013.01); *B64D 11/0649* (2014.12); *B64D 11/0696* (2013.01)

(58) Field of Classification Search
CPC ............ B64D 11/0648; B64D 11/0649; B64D 11/0696
See application file for complete search history.

(56) References Cited

U.S. PATENT DOCUMENTS

| | | | | |
|---|---|---|---|---|
| 4,526,421 A | * | 7/1985 | Brennan ................ | B64D 11/06 108/51.3 |
| 2005/0184566 A1 | * | 8/2005 | Baumann ............... | B64D 11/06 297/248 |

(Continued)

FOREIGN PATENT DOCUMENTS

| DE | 102012020032 A1 | 4/2014 |
|---|---|---|
| WO | 2015187633 A1 | 12/2015 |

OTHER PUBLICATIONS

International Patent Application No. PCT/US2015/033690, Search Report and Written Opinion, dated Sep. 18, 2015.

(Continued)

*Primary Examiner* — Philip F Gabler
(74) *Attorney, Agent, or Firm* — Kilpatrick Townsend & Stockton LLP; Dean W. Russell; Davidson G. Lucas

(57) ABSTRACT

A passenger seat (100) that includes at least one back rest frame (191-194) with at least one through-hole, at least one lateral structural member (101,102) that is perpendicular to the at least one back rest frame (191-194) and is disposed in the at least one through-hole, and at least one floor attachment frame (195,196) with at least one through-hole that is coaxial with the at least one through-hole of the at least one back rest frame (191-194). Each lateral structural member include an internal composite tube (101,102) that extends a full lateral width of the passenger seat and a plurality of outer tubes (151-162) disposed on an outer surface of the internal composite tube.

22 Claims, 2 Drawing Sheets

(56) References Cited

U.S. PATENT DOCUMENTS

2013/0009435 A1* 1/2013 Westerink ............ B60N 2/1625
297/313
2016/0340045 A1* 11/2016 Roderwald ............ B64D 11/06

OTHER PUBLICATIONS

European Patent Office, European Patent Application No. 15728369.8, Intention to Grant, Communication under Rule 71(3) dated Apr. 20, 2018, 22 pgs.

* cited by examiner

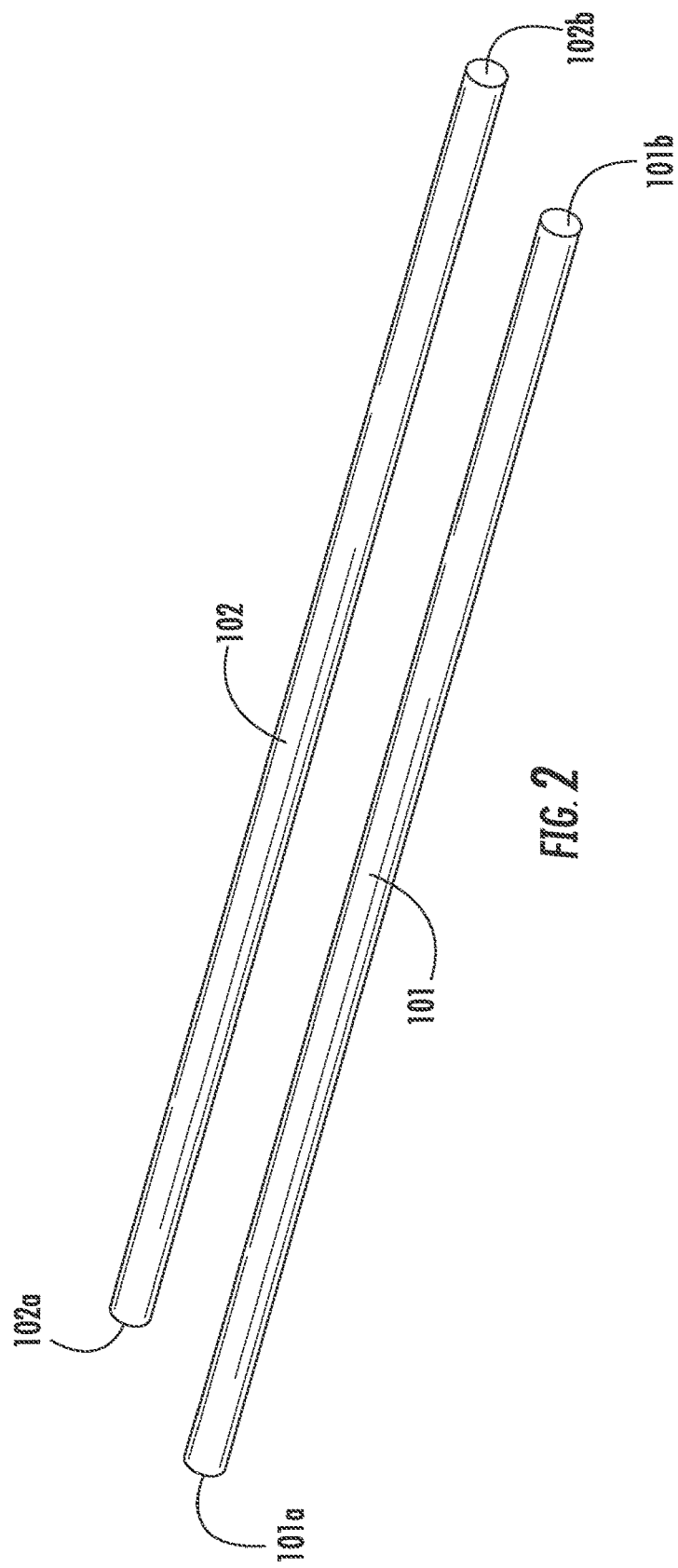

HYBRID COMPOSITE STRUCTURAL MEMBER

CROSS-REFERENCE TO RELATED APPLICATIONS

This application is the U.S. national phase entry of International Patent Application Ser. No. PCT/US2015/033690 ("the '690 application"), filed Jun. 2, 2015, which application is related to and claims priority benefits from U.S. Provisional Application Ser. No. 62/006,964 ("the '964 application"), filed on Jun. 3, 2014, entitled HYBRID COMPOSITE TUBE. The '690 and '964 applications are hereby incorporated in their entireties by this reference.

FIELD OF THE INVENTION

The field of the invention relates to structural assemblies and passenger seats for aircraft or the like.

BACKGROUND

Many passenger seats such as those on passenger aircraft, buses, trains, and the like account for significant weight of the vehicle but must meet other requirements related to passenger comfort, safety, and convenience. For example, seat structural assemblies are designed to meet specific loading conditions (e.g., crash conditions). The structural design of conventional seats may include inefficiencies that lead to extra undesirable weight.

In certain situations, it may be desirable to design seats and related subcomponents to maximize structural efficiency with load paths configured to transfer load from the passenger through the seat and into the structure of the aircraft. Efficient structural design facilitates lighter designs using less material.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: at least one back rest frame with at least one through-hole; at least one lateral structural member that is perpendicular to the at least one back rest frame and is disposed in the at least one through-hole of the at least one back rest frame; and at least one floor attachment frame with at least one through-hole, wherein the at least one through-hole of the at least one floor attachment frame is coaxial with the at least one through-hole of the at least one back rest frame, wherein each lateral structural member comprises an internal composite tube that extends an entire lateral width of the passenger seat and a plurality of outer tubes disposed on an outer surface of the internal composite tube.

In some embodiments, each of the plurality of outer tubes is disposed at an interface between (a) the lateral structural member and (b) at least one of the at least one back rest frame and the at least one floor attachment frame.

In certain embodiments, the plurality of outer tubes are metallic and are chemically bonded to the outer surface of the internal composite tube.

In some embodiments, the at least one back rest frame comprises four back rest frames; the at least one lateral structural member comprises two lateral structural members; the at least one floor attachment frame comprises two floor attachment frames; and the passenger seat is configured to provide seating for three passengers side-by-side. In certain embodiments, the two floor attachment frames distribute forces from the passenger seat into an aircraft structure; and at least one of the four back rest frames is cantilevered with respect to the two floor attachment frames. At least one of the plurality of outer tubes, in some embodiments, comprises additional material to increase load bearing capability due to the at least one cantilevered back rest frame.

Each internal composite tube, in some embodiments, has a constant cross-section along the entire lateral width of the passenger seat. In certain embodiments, each internal composite tube has a annular cross-section with a 40 mm outer diameter and a 37 mm inner diameter.

According to certain embodiments of the present invention, a passenger seat structural assembly comprises: two lateral structural members extending a full lateral width of the passenger seat structural assembly; at least two back rest frames, wherein each back rest frame comprises a lower portion forming an approximately horizontal seating area and an upper portion forming a back rest, the lower portion including two through-holes such that the two lateral structural members are disposed inside the two through-holes; and at least two floor attachment frames, each floor attachment frame including two through-holes such that the two lateral structural members are disposed inside the two through-holes, wherein each lateral structural member comprises an internal composite tube that extends an entire lateral width of the passenger seat structural assembly and a plurality of outer tubes disposed on an outer surface of the internal composite tube.

Each of the plurality of outer tubes, in some embodiments, is disposed at an interface between (a) the two lateral structural members and (b) at least one of the at least two back rest frames and the at least two floor attachment frames.

In some embodiments, the plurality of outer tubes are metallic and are chemically bonded to the outer surface of the internal composite tube.

In certain embodiments, the at least two back rest frames comprise four back rest frames; and the passenger seat structural assembly is configured to provide seating for three passengers side-by-side.

In some embodiments, the at least two floor attachment frames distribute forces from the passenger seat structural assembly into an aircraft structure; and at least one of the four back rest frames is cantilevered with respect to the at least two floor attachment frames. At least one of the plurality of outer tubes, in certain embodiments, comprises additional material to increase load bearing capability due to the at least one cantilevered back rest frame.

Each internal composite tube, in some embodiments, has a constant cross-section along the entire lateral width of the passenger seat structural assembly. In certain embodiments, each internal composite tube has a annular cross-section with a 40 mm outer diameter and a 37 mm inner diameter.

According to certain embodiments of the present invention, a passenger seat comprises: four back rest frames, each back rest frame having at least one through-hole; two lateral structural members that are perpendicular to the four back rest frames and are disposed in the at least one through-hole of the four back rest frames; and at least two floor attachment frames, each floor attachment frame having at least one through-hole that is coaxial with the at least one through-hole of the four back rest frames, wherein each lateral structural member comprises (a) an internal composite tube that extends an entire lateral width of the passenger seat and (b) four outer tubes disposed on an outer surface of the internal composite tube such that the four outer tubes are disposed at the interfaces between the lateral structural member and the four back rest frames.

The four outer tubes, in certain embodiments, are metallic and are chemically bonded to the outer surface of the internal composite tube.

In some embodiments, the at least two floor attachment frames distribute forces from the passenger seat into an aircraft structure; and at least one of the four back rest frames is cantilevered with respect to the at least two floor attachment frames. In certain embodiments, at least one of the four outer tubes comprises additional material to increase load bearing capability due to the at least one cantilevered back rest frame.

BRIEF DESCRIPTION OF THE DRAWINGS

FIG. 2 is a partial view of the passenger seat of FIG. 1.

DETAILED DESCRIPTION

Figure 1:
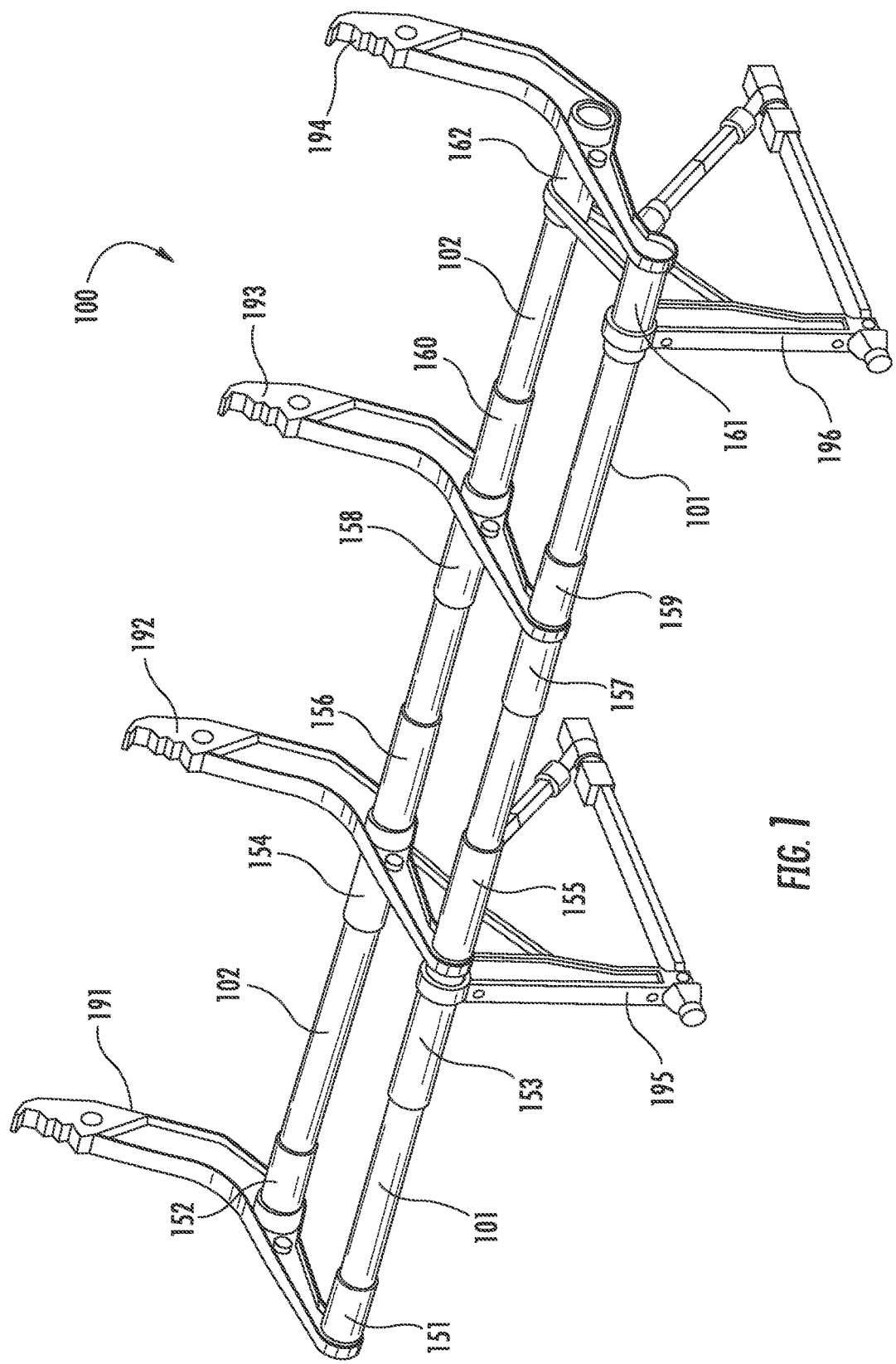
FIG. 1 is a perspective view of a passenger seat according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1 and 2 illustrate embodiments of a passenger seat structural assembly 100. In these embodiments, the passenger seat structural assembly 100 comprises at least one back rest frame 191, 192, 193, 194; at least one floor attachment frame 195, 196; and at least one lateral structural member assembly (which may include a lateral structural member 101, 102). In some embodiments, as shown in FIG. 1, each lateral structural member may attach to some or all of the back rest frames 191, 192, 193, 194 and some or all of the floor attachment frames 195, 196. For example, as shown in FIG. 1, the back rest frames 191, 192, 193, 194 and the floor attachment frames 195, 196 each include a through-hole for each lateral structural member (where the through-holes approximately match the cross-sectional shape of the lateral structural members). Although FIG. 1 illustrates a seat structural assembly 100 configured for three side-by-side seats, the embodiments described herein are applicable to seat assemblies configured with any number of seats (including as few as one seat).

In some embodiments, the seat structural assembly 100 is arranged where at least one passenger sits on a surface formed by at least one lateral structural member (e.g., 101, 102) and the lower portions (forming an approximately horizontal seating area) of the at least one back rest frame 191, 192, 193, 194 such that the backs of the passengers are disposed against the upper portions of the at least one back rest frame 191, 192, 193, 194. Forces created by the passenger or passengers directly affect the lateral structural member assemblies and the back rest frames. The forces are distributed through the lateral structural members to the at least one floor attachment frame 195, 196 (and subsequently into the structure of the aircraft). The primary load path for distributing forces to the floor attachment frames 195, 196 are internal composite tubes 101 and 102, where outer tubes 151-162 provide local reinforcement for the internal composite tubes 101 and 102.

The lateral structural members are typically an assembly of two or more metallic concentric components that each extend the full lateral width of the seat assembly. However, the lateral structural member assemblies (as shown in FIG. 1) can be designed using lighter weight components to maximize weight efficiency (using a combination of both component shape and/or material choice).

As shown in FIGS. 1 and 2, one example of lateral structural member assemblies includes a hybrid construction with internal composite tubes 101 and 102 and at least one localized outer tube (i.e., metallic tubes 151-162). As shown in FIG. 2, in some embodiments, the internal composite tubes 101 and 102 extend the full lateral width of the seat structural assembly 100, while one or more of the outer tubes supplement the load bearing capability of the internal composite tubes 101 and 102. For example, internal composite tube 101 extends from end 101a to end 101b and internal composite tube 102 extends from end 102a to end 102b. The seat structural assembly 100 may be designed such that the outer tubes act as reinforcement members for the internal composite tubes 101 and 102 and may be located based on numerous factors including, for example, one or more of the following: weight, loading conditions, and interfaces with additional components.

To ensure a robust interface between the frame members (i.e., the at least one back rest frame 191, 192, 193, 194 and/or the at least one floor attachment frame 195, 196) and the internal composite tubes 101 and 102, one or more outer tubes are disposed on the outer surface of the internal composite tubes 101 and 102 at each interface. For example, outer tube 151 is disposed at the interface between internal composite tube 101 and back rest frame 191 (near end 101a) and outer tube 152 is disposed at the interface between internal composite tube 102 and back rest frame 191 (near end 102a). The larger outer diameter of outer tubes 151 and 152 dictates more advantageous section properties (i.e., inertia). Furthermore, in some embodiments, the outer tubes 151 and 152 are metallic and thus are better suited (compared to a composite material of the internal composite tubes 101 and 102) to spread or distribute loads from the back rest frame 191 to the internal composite tubes 101 and 102. In other words, the outer tubes 151 and 152 reduce the likelihood of cracking and local material failure at the interface between the back rest frame 191 and the internal composite tubes 101 and 102.

In some embodiments, the outer tubes 151 and 152 are integral to the internal composite tubes 101 and 102 and are made from the same material as the internal composite tubes 101 and 102 (i.e., local plies or layers of composite material). Conversely, in some embodiments, the outer tubes 151 and 152 are separate components from the internal composite tubes 101 and 102 (such that the internal composite tubes 101 and 102 have a constant cross-section). When the outer tubes 151 and 152 are separate components, the outer tubes 151 and 152 may be the same material as the internal composite tubes 101 and 102 or may be a different material (e.g., metallic, such as aluminum, steel, or titanium). In other words, the outer tubes 151 and 152 may act as washers.

Similar to outer tube 151, on internal composite tube 101, outer tubes 153 and 155 are disposed adjacent to the interface between internal composite tube 101 and (1) the back rest frame 192 and (2) the floor attachment frame 195. In some embodiments, outer tubes 153 and 155 are a single component (where 153 is the portion of the outer tube that extends toward back rest frame 191 and 155 is the portion of the outer tube that extends toward back rest frame 193). In some embodiments, outer tubes 153 and 155 are separate components that may attach to one another. To effectively distribute the forces from back rest frame 191 (which is cantilevered from floor attachment frame 195), outer tube 153 may include more material than some other outer tubes (i.e., axial length and/or thickness). Outer tubes 154 and 156 (similar to outer tubes 153 and 155) are disposed adjacent to the interface between internal composite tube 102 and (1) the back rest frame 192 and (2) the floor attachment frame 195. In some embodiments, outer tubes 153 and 155 is/are 4 to 15 inches long.

In some embodiments, the back rest frame 192 and the floor attachment frame 195 are disposed adjacent to one another but are not directly attached to one another. The back rest frame 192 and the floor attachment frame 195 may both be attached to outer tubes 153/155 and to outer tubes 154/156. Back rest frame 193 may be disposed approximately halfway between floor attachment frames 195 and 196 such that internal composite tubes 101 and 102 distribute portions of the forces from back rest frame 193 to both floor attachment frame 195 and floor attachment frame 196. On internal composite tube 101, outer tubes 157 and 159 are disposed adjacent to the interface between internal composite tube 101 and the back rest frame 193. Similarly, on internal composite tube 102, outer tubes 158 and 160 are disposed adjacent to the interface between internal composite tube 102 and the back rest frame 193. In some embodiments, outer tubes 157 and 159 are a single component and/or outer tubes 158 and 160 are a single component (where 157 and 158 are the portions of the outer tubes that extend toward back rest frame 192 and 159 and 160 are the portions of the outer tube that extend toward back rest frame 194). In some embodiments, outer tubes 157 and 159 are separate components that may attach to one another and outer tubes 158 and 160 are separate components that may attach to one another. Outer tubes 157-160 are sized to ensure that bending forces from back rest frame 193 are effectively distributed to floor attachment frame 195 and floor attachment frame 196.

In some embodiments, the back rest frame 194 and the floor attachment frame 196 are disposed adjacent to one another but are not directly attached to one another. The back rest frame 194 and the floor attachment frame 196 may both be attached to outer tube 161 (near end 101b) and to outer tube 162 (near end 102b). The back rest frame 194 may be cantilevered with respect to floor attachment frame 196. However, as shown in FIG. 1, the cantilever distance of back rest frame 194 is substantially less than that of back rest frame 191.

To secure outer tubes 151-162 to the internal composite tubes 101 and 102, an adhesive or chemical bonding may be used. The internal composite tubes 101 and 102 may be constructed using pultrusion, filament winding, autoclave based, out-of-autoclave, or other composite manufacturing techniques.

In some embodiments, the internal composite tubes 101 and 102 have a circular or annular cross-section where the outside diameter of the internal composite tubes 101 and 102 is 40 mm and the inside diameter of the internal composite tubes 101 and 102 is 37 mm (wall thickness of 1.5 mm). The outer tubes 157-160, in certain embodiments, have a default size where the inner diameter is 41.5 mm and the outer diameter is 44.45 mm. The length of outer tubes 151 and 152 may be approximately 1-3 inches. The length of outer tubes 154/156, 157/159 and 158/160 may be approximately 4-9 inches. The length of outer tubes 161 and 162 may be approximately 3-6 inches.

The components of the passenger seat 100 may be formed of materials including, but not limited to, carbon composite, woven graphite, unidirectional graphite, resin-impregnated materials, plastic, thermoplastic, steel, aluminum, stainless steel, other plastic or polymer materials, other metallic materials, other composite materials, or other similar materials. Moreover, the components of the passenger seat 100 may be attached to one another via suitable fasteners, which include, but are not limited to, screws, bolts, rivets or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
    at least one back rest frame with at least one through-hole;
    at least one lateral structural member that is perpendicular to the at least one back rest frame and is disposed in the at least one through-hole of the at least one back rest frame; and
    at least one floor attachment frame with at least one through-hole, wherein the at least one through-hole of the at least one floor attachment frame is coaxial with the at least one through-hole of the at least one back rest frame, wherein:
    each lateral structural member comprises an internal composite tube that extends an entire lateral width of the passenger seat and a plurality of outer tubes disposed on an outer surface of the internal composite tube; and
    an outer surface of each of the plurality of outer tubes directly interfaces with at least one of the at least one back rest frame and the at least one floor attachment frame.

2. The passenger seat of claim 1, wherein each of the plurality of outer tubes comprises a constant cross-section along an entire length thereof.

3. The passenger seat of claim 1, wherein the plurality of outer tubes are metallic and are chemically bonded to the outer surface of the internal composite tube.

4. The passenger seat of claim 1, wherein:
the at least one back rest frame comprises four back rest frames;
the at least one lateral structural member comprises two lateral structural members;
the at least one floor attachment frame comprises two floor attachment frames that distribute forces from the passenger seat into an aircraft structure;
at least one of the four back rest frames is cantilevered with respect to the two floor attachment frames; and
the passenger seat is configured to provide seating for three passengers side-by-side.

5. The passenger seat of claim 4 wherein at least one of the plurality of outer tubes comprises additional material to increase load bearing capability due to the at least one cantilevered back rest frame.

6. The passenger seat of claim 1, wherein each internal composite tube has a constant cross-section along the entire lateral width of the passenger seat.

7. The passenger seat of claim 6, wherein each internal composite tube has a annular cross-section with a 40 mm outer diameter and a 37 mm inner diameter.

8. The passenger seat of claim 1, wherein:
each of the plurality of outer tubes comprise the same composite material as the respective internal composite tube; and
each of the plurality of outer tubes are an integral feature on the outer surface of the respective internal composite tube.

9. The passenger seat of claim 1, wherein an entire interior surface of each of the plurality of outer tubes directly interfaces with the outer surface of the internal composite tube.

10. A passenger seat structural assembly comprising:
two lateral structural members extending a full lateral width of the passenger seat structural assembly;
at least two back rest frames, wherein each back rest frame comprises a lower portion forming an approximately horizontal seating area and an upper portion forming a back rest, the lower portion including two through-holes such that the two lateral structural members are disposed inside the two through-holes; and
at least two floor attachment frames, each floor attachment frame including two through-holes such that the two lateral structural members are disposed inside the two through-holes, wherein:
each lateral structural member comprises an internal composite tube that extends an entire lateral width of the passenger seat structural assembly and a plurality of outer tubes disposed on an outer surface of the internal composite tube; and
an outer surface of each of the plurality of outer tubes directly interfaces with at least one of the at least two back rest frames and the at least two floor attachment frames.

11. The passenger seat structural assembly of claim 10, wherein each of the plurality of outer tubes comprises a constant cross-section along an entire length thereof.

12. The passenger seat structural assembly of claim 10, wherein the plurality of outer tubes are metallic and are chemically bonded to the outer surface of the internal composite tube.

13. The passenger seat structural assembly of claim 10, wherein:
the at least two back rest frames comprise four back rest frames;
the at least two floor attachment frames distribute forces from the passenger seat structural assembly into an aircraft structure;
at least one of the four back rest frames is cantilevered with respect to the at least two floor attachment frames; and
the passenger seat structural assembly is configured to provide seating for three passengers side-by-side.

14. The passenger seat structural assembly of claim 13, wherein at least one of the plurality of outer tubes comprises additional material to increase load bearing capability due to the at least one cantilevered back rest frame.

15. The passenger seat structural assembly of claim 10, wherein:
each of the plurality of outer tubes comprise the same composite material as the respective internal composite tube; and
each of the plurality of outer tubes are an integral feature on the outer surface of the respective internal composite tube.

16. The passenger seat structural assembly of claim 10, wherein an entire interior surface of each of the plurality of outer tubes directly interfaces with the outer surface of the internal composite tube.

17. A passenger seat comprising:
four back rest frames, each back rest frame having at least one through-hole;
two lateral structural members that are perpendicular to the four back rest frames and are disposed in the at least one through-hole of the four back rest frames; and
at least two floor attachment frames, each floor attachment frame having at least one through-hole that is coaxial with the at least one through-hole of the four back rest frames, wherein:
each lateral structural member comprises (a) an internal composite tube that extends an entire lateral width of the passenger seat and (b) four outer tubes disposed on an outer surface of the internal composite tube such that the four outer tubes are disposed at the interfaces between the lateral structural member and the four back rest frames; and
an outer surface of each of the four outer tubes directly interfaces with an inner surface of one of the at least one through-hole of the at least two floor attachment frames.

18. The passenger seat of claim 17, wherein:
the at least two floor attachment frames distribute forces from the passenger seat into an aircraft structure; and
at least one of the four back rest frames is cantilevered with respect to the at least two floor attachment frames.

19. The passenger seat of claim 18, wherein at least one of the four outer tubes comprises additional material to increase load bearing capability due to the at least one cantilevered back rest frame.

20. The passenger seat of claim 17, wherein each of the four outer tubes comprises a constant cross-section along an entire length thereof.

21. The passenger seat of claim 17, wherein:
    each of the four outer tubes comprises the same composite material as the respective internal composite tube; and
    each of the four outer tubes are an integral feature on the outer surface of the respective internal composite tube.

22. The passenger seat of claim 17, wherein an entire interior surface of each of the four outer tubes directly interfaces with the outer surface of the internal composite tube.

\* \* \* \* \*